USO05329969A

United States Patent [19]
Rasmussen et al.

[11] Patent Number: 5,329,969
[45] Date of Patent: Jul. 19, 1994

[54] FLUID CONTROLLER WITH JOYSTICK CAPABILITY AND ACTUATOR THEREFOR

[75] Inventors: Kenneth G. Rasmussen, Maple Grove; Dwight B. Stephenson, Savage; William J. Novacek, Bloomington, all of Minn.

[73] Assignee: Eaton Corporation, Cleveland, Ohio

[21] Appl. No.: 100,012

[22] Filed: Jul. 29, 1993

Related U.S. Application Data

[60] Continuation-in-part of Ser. No. 850,712, Mar. 13, 1992, which is a division of Ser. No. 703,318, May 20, 1991, Pat. No. 5,115,640.

[51] Int. Cl.[5] .............................................. F15B 9/09
[52] U.S. Cl. ............................ 137/625.24; 91/358 R; 91/467; 180/142
[58] Field of Search ............... 60/384; 91/358 R, 467; 137/625.24; 180/142

[56] References Cited

U.S. PATENT DOCUMENTS 3,584,538 6/1971 Peterson .
3,690,400 9/1972 Uchiyama et al. .
4,085,657 4/1978 Kervagoret .
5,016,672 5/1991 Stephenson .
5,115,640 5/1992 Stephenson et al. .

Primary Examiner—Gerald A. Michalsky
Attorney, Agent, or Firm—L. J. Kasper

[57] ABSTRACT

A controller (11) and a system for controlling the flow of fluid to a fluid pressure operated device (C) are disclosed. The controller is of the type including a rotatable spool valve (35) and a relatively rotatable sleeve valve (37). Relative rotation between the spool and sleeve define a main fluid path (MFP) and relative axial movement therebetween defines an auxiliary fluid path (AFP). An actuator (65) generates a mechanical output (71) in response to an electrical input signal (CS) to move the sleeve (37) between its neutral axial position (FIG. 6) and an axial operating position (FIG. 7). Axial movement of the sleeve is controlled by a joystick (J). The system includes various sensors (S,PS,G,P), which can sense a predetermined condition and generate an interrupt signal to interrupt or change the gain of the electrical input signal (CS).

44 Claims, 8 Drawing Sheets

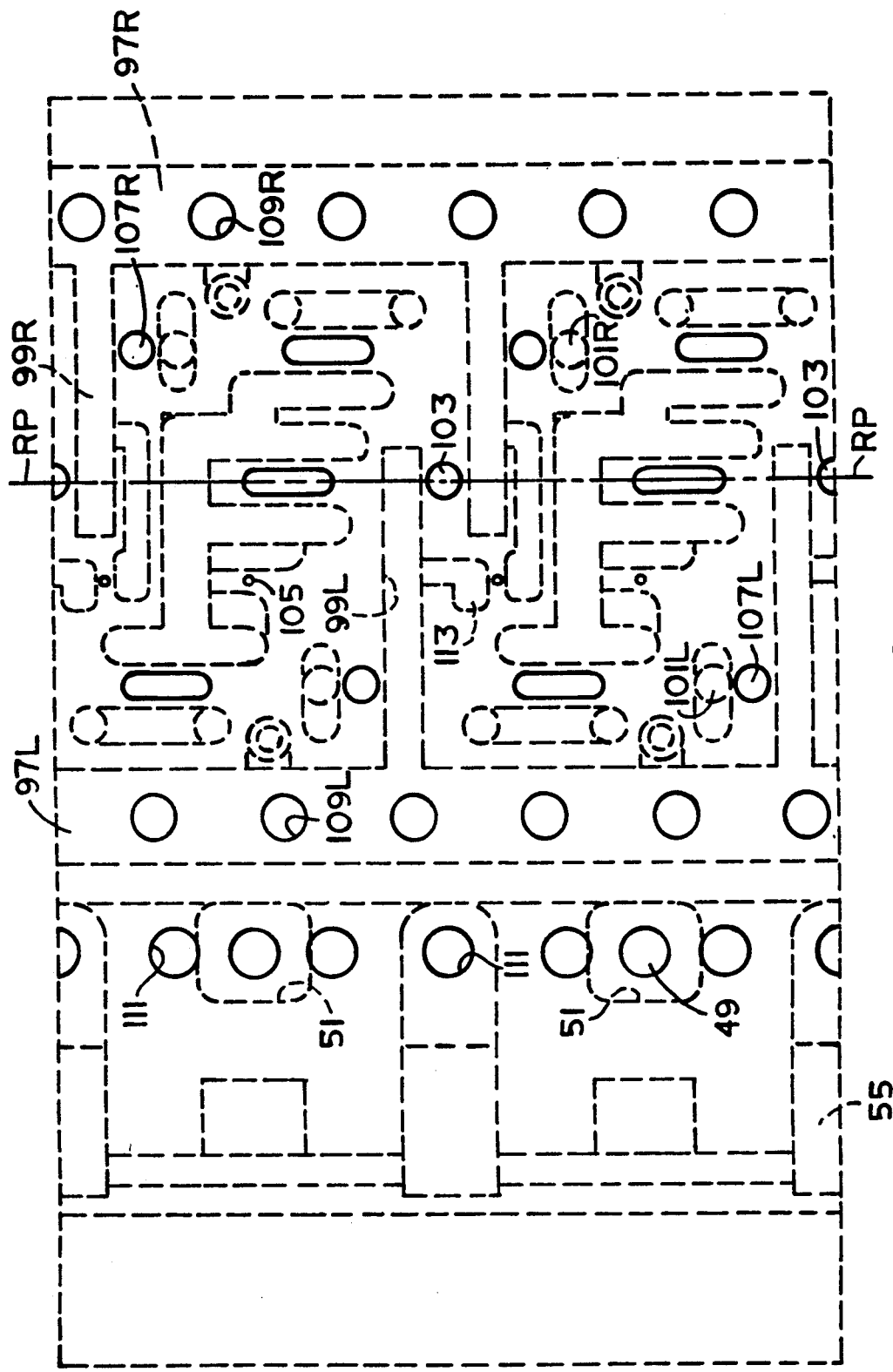

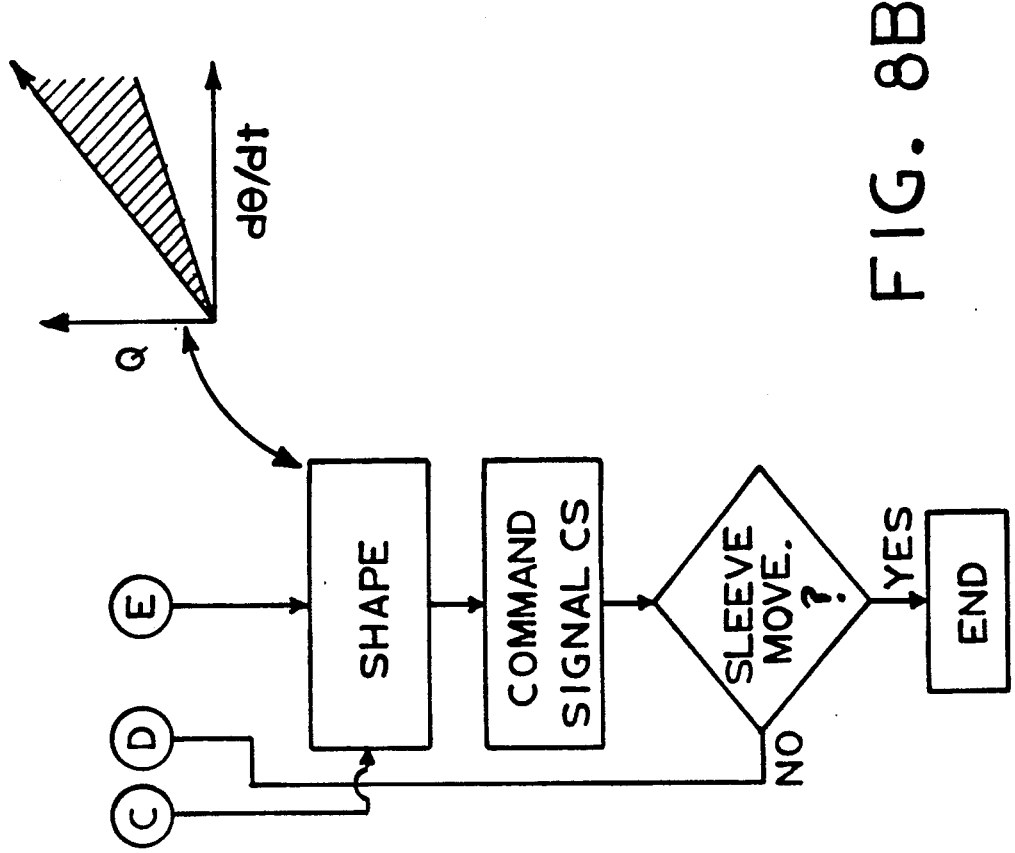
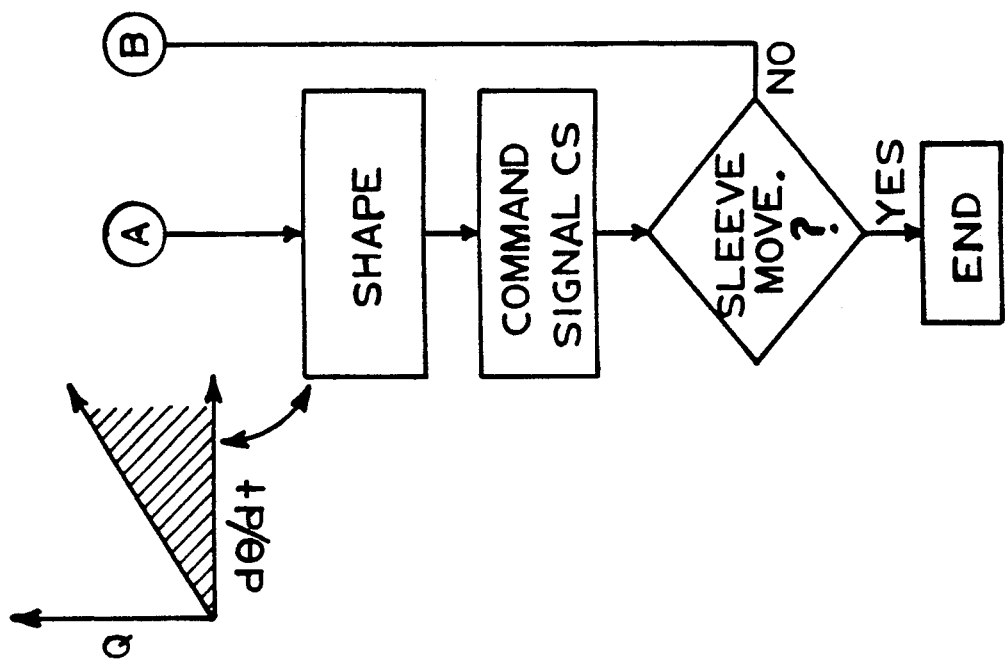
FIG. 8B

FLUID CONTROLLER WITH JOYSTICK CAPABILITY AND ACTUATOR THEREFOR

CROSS REFERENCE TO RELATED APPLICATION

This application is a continuation-in-part of co-pending application U.S. Ser. No. 850,712, filed Mar. 13, 1992, which is a divisional application of U.S. Ser. No. 703,318, filed May 20, 1991, in the names of Dwight B. Stephenson and James J. Hastreiter for a "FLUID CONTROLLER AND LOGIC CONTROL SYSTEM FOR USE THEREWITH", now U.S. Pat. No. 5,115,640.

BACKGROUND OF THE DISCLOSURE

The present invention relates to fluid controllers of the type used to control the flow of fluid from a source of pressurized fluid to a fluid pressure actuated device, such as a steering cylinder for steering a vehicle. More particularly, the present invention relates to such a steering system having both a normal input, such as the vehicle steering wheel, and an auxiliary input, such as a joystick.

Although the present invention may be used in connection with fluid controllers of many types, and having various applications, it is especially advantageous when used in conjunction with a full-fluid-linked steering system, and will be described in connection therewith.

A typical fluid controller of the type to which the present invention relates includes a housing which defines various fluid ports, and further includes a fluid meter, a valve means, and an arrangement for imparting follow-up movement to the valve means, in response to the flow of fluid through the fluid meter. The flow through the controller valve means is directly proportional to the area of variable flow control orifices in the main fluid path, the area of the flow control orifices in turn typically being proportional to the rate at which the steering wheel is rotated.

A typical application for a full-fluid-linked steering system of the type to which the present invention relates would be a vehicle such as is used on a construction site. Such a vehicle is used primarily in one of two operating modes: first, the vehicle is driven in a "roading" mode, i.e., it is being driven on the road, at normal roading speeds, in order to reach the work site. Secondly, the vehicle is operated in a working mode, on the work site, and performing operations such as moving a pile of dirt, etc.

The roading and working modes of operation described above present very different steering requirements, as is now well known to those skilled in the art. When roading the vehicle, a relatively low gain rate is required, whereas, when operating in the working mode, a relatively high gain rate is required. As used herein, the term "gain rate" refers to the rate of change of steered wheel position for a given amount of steering input. Those skilled in the art are well aware that a relatively high gain rate steering system would be undesirable when roading the vehicle, because it could result in oversteering, possibly causing loss of control of the vehicle. Conversely, a relatively low gain rate steering system is undesirable when the vehicle is in the working mode, because excessive rotation of a steering wheel will quickly lead to operator fatigue, and less productivity on the work site.

Those skilled in the art have for some time recognized that it is desirable to now provide the steering operator with a steering wheel for use when the vehicle is in the roading mode, while providing the operator with a joystick for use when the vehicle is in the working mode. The steering wheel gives the operator somewhat the same feel as driving a car, which is desirable for the roading mode, while the joystick may be used to provide relatively large steering changes, with relatively little operator input, which is desirable for use in the working mode.

One known, commercially available steering system includes a conventional steering control unit, which receives an input from the steering wheel, and a separate, electrically actuated proportional flow control valve, which receives an input by means of a joystick. The output of both the steering control valve and the proportional valve goes to the steering cylinder in a parallel arrangement. There is no interface between the two subsystems (i.e., the one controlled by the wheel, and the other controlled by the joystick), or any ability for the flow output of one subsystem to be augmented by flow output from the other subsystem.

One of the disadvantages of known steering wheel/joystick systems is the complication, and expense of coordinating the portion of the system operated by the steering wheel with the portion of the system operated by the joystick. As one example, if the operator is steering by means of the joystick, and then begins to rotate the steering wheel, there must be logic or some sort of interface provided to determine whether the steering wheel input or the joystick input would take precedence. As a second example if the vehicle is operating above a predetermined vehicle speed, or operating above a predetermined transmission gear, it may be desirable, or even legally required, to prevent steering in response to the joystick input, and permit the operator to steer only by means of the steering wheel.

U.S. Pat. Nos. 5,016,672 and 5,115,640, both of which are assigned to the assignee of the present invention and incorporated herein by reference, disclose fluid controllers in which the valve means, comprising a spool and sleeve, can be actuated by rotation of a steering wheel in the conventional manner. In addition, the sleeve valve may be moved axially, relative to the spool valve, to define an auxiliary fluid path. Control of the axial position of the sleeve valve is by means of a pilot pressure chamber adjacent one axial end of the sleeve valve, the pressure in the pilot pressure chamber being controlled by a solenoid valve. Although the steering system and controller disclosed in the above-incorporated patents provide greatly enhanced performance, it has been found that the pilot control of the axial position of the sleeve valve may be too slow for the type of interface required between steering wheel input and joystick input. It has also been found that variations in fluid temperature and viscosity may make it difficult for such a pilot control system to provide accurate, repeatable performance. In addition, the controller of the above-incorporated patents, utilizing pilot control, does not readily provide axial position feedback of the sleeve valve.

SUMMARY OF THE INVENTION

Accordingly, it is an object of the present invention to provide an improved steering system, and fluid controller for use therein, which is capable of operating in response to either steering wheel input or joystick input.

It is a more specific object of the present invention to provide such an improved steering system, and fluid controller for use therein, which achieves the above-stated object without the need for a complicated and expensive interface between the position of the system operated by the steering wheel, and the portion of the system operated by the joystick.

It is a further, related object of the present invention to provide such a system in which the portion of the system operated by the joystick includes logic means and various system interrupts, whereby steering by means of the joystick can be prevented in response to the sensing of any one of several predetermined conditions.

The above and other objects of the invention are accomplished by the provision of a controller operable to control the flow of fluid from a source of pressurized fluid to a fluid pressure operated device. The controller is of the type including housing means defining an inlet port for connection to the source, a return port for connection to the reservoir, and first and second control fluid ports for connection to the fluid pressure operated device. Valve means is disposed in the housing means and comprises a primary, rotatable valve member, and a cooperating, relatively rotatable follow-up valve member, the primary and follow-up valve members defining a neutral rotary position, and a rotary operating position in which the primary valve member is rotatably displaced from the neutral rotary position, relative to the follow-up valve member. The housing means and the valve members cooperate to define a main fluid path providing fluid communication between the inlet port and the first control fluid port, and between the second control fluid port and the return port when the valve members are in the rotary operating position. The valve members define a neutral axial position, and an axial operating position in which the follow-up valve member is axially displaced from the neutral axial position, relative to the primary valve member. The housing means and the valve members cooperate to define an auxiliary fluid path providing fluid communication between the inlet port and one of the first and second control fluid ports, and between the other of the control fluid ports and the return port when the valve members are in the axial operating position.

The controller is characterized by an electromagnetic actuator operably associated with the housing means and operable to generate a predetermined mechanical output in response to a predetermined electrical input signal. The controller includes means operable to convert the mechanical output of the actuator into axial motion of the follow-up valve member between the neutral axial position and the axial operating position.

BRIEF DESCRIPTION OF THE DRAWINGS

FIG. 6 is an overlay view of the valving used in the fluid controller shown in FIG. 2, but on a larger scale than in FIG. 2, and with the valving shown in the rotary, neutral, and neutral axial positions.

FIGS. 8A and 8B together comprise is a block diagram of a control logic system to be utilized in conjunction with the electronic controller shown in the schematic of FIG. 1.

DESCRIPTION OF THE PREFERRED EMBODIMENT

Figure 1:
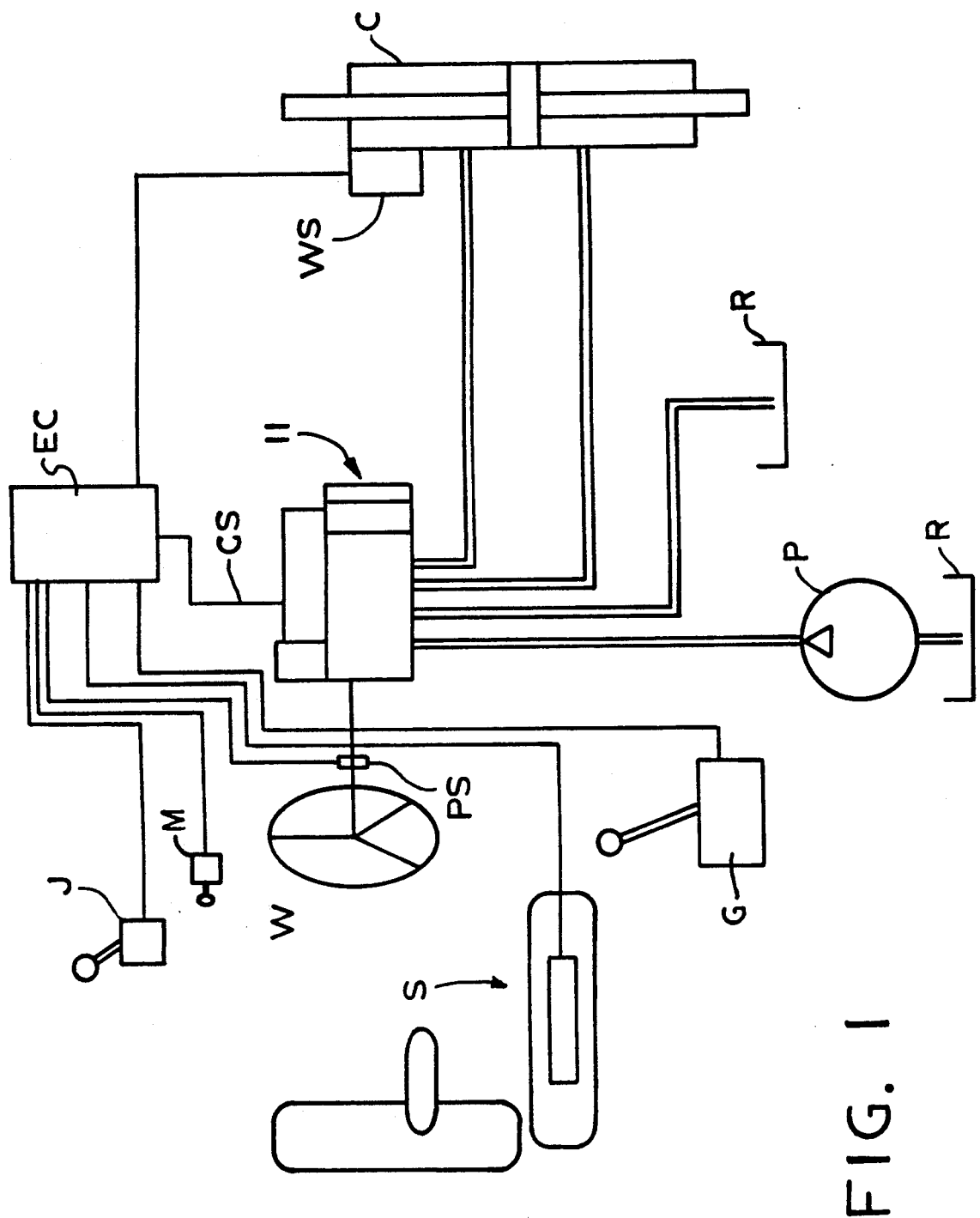
FIG. 1 is a somewhat pictorial schematic of the vehicle steering system of the present invention.

Referring now to the drawings, which are not intended to limit the invention, FIG. 1 is a somewhat pictorial schematic of a vehicle hydrostatic power steering system of the type to which the present invention relates. The system includes a fluid pump P which receives fluid from a system reservoir R, and directs pressurized fluid to a fluid controller, generally designated 11. The controller 11 directs metered, pressurized fluid to a steering cylinder C, normally in response to rotation of a steering wheel W.

Disposed adjacent the steering wheel W, and typically within the cab of a vehicle such as a tractor or combine, is an operator's seat, generally designated S. Also disposed adjacent the wheel W in the cab is a transmission gear shift G, a mode select switch M, and a joystick J. Attached to the steering cylinder C is a steered wheel sensor WS. In addition, operably associated with the steering wheel W is a wheel position sensor PS. The operator's seat S includes a switch, the function of which is to indicate the presence or absence of the operator, and hereinafter the switch in the operator's seat will be designated S. Similarly, the transmission gear shift G is equipped to provide a signal indicative of the particular transmission gear which has been selected, and the device which generates the signal will hereinafter be designated G.

The signals from the gear sensor G, the seat switch S, the position sensor PS, the mode switch M, and the joystick J are all inputs to an electronic controller EC. Hereinafter, the signals from the five input elements (sensors, switches, and joystick) will bear the reference numerals of their respective elements. The electronic controller EC is also in communication with the fluid controller 11 by means of a command signal CS. The way in which the various input signals described above are utilized in the system by the electronic controller EC will be described in greater detail subsequently.

It is one important aspect of the present invention that the operator can control the flow of pressurized fluid from the pump P through the controller 11 to the steering cylinder C either by means of the steering wheel W or the joystick J. As was described in the BACKGROUND OF THE DISCLOSURE, the steering wheel W is typically used by the operator in the "roading" mode, while the joystick is typically used by the operator when the vehicle is in the working mode. In such a system, it is desirable for the steering wheel W to operate the fluid controller 11 at a relatively low gain rate, while the joystick J would be used to operate the controller 11 at a relatively high gain rate. In the system shown schematically in FIG. 1, the mode select switch M is included to permit the operator to select, manually, between the high and low gain rates, as will be described in greater detail subsequently.

CONTROLLER

Figure 2:
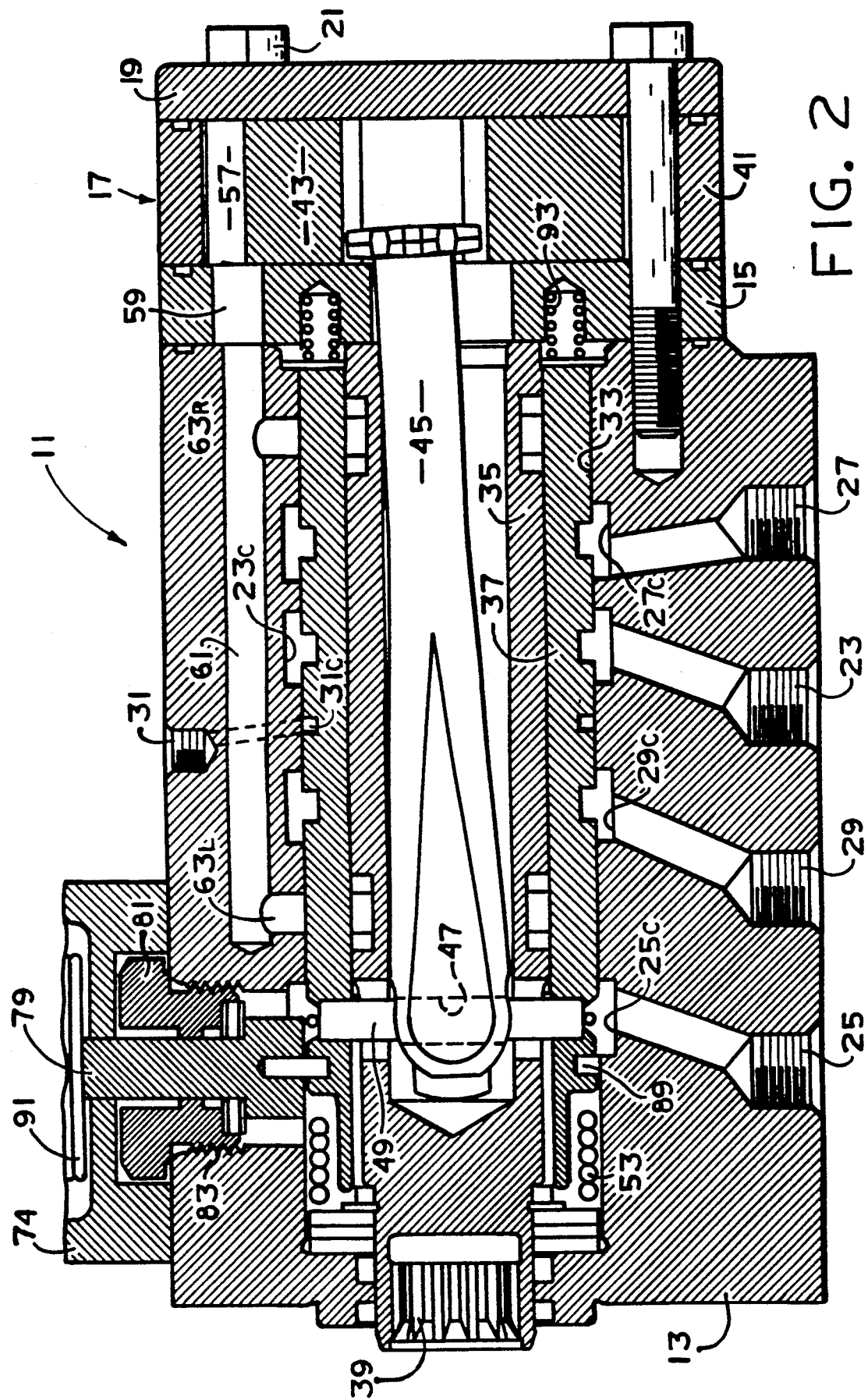
FIG. 2 is a fragmentary, axial cross-section of the fluid controller shown schematically in FIG. 1.

Referring now primarily to FIG. 2, the fluid controller 11 will be described in some detail. The fluid controller 11 may be of the general type illustrated and described in above-incorporated U.S. Pat. Nos. 5,016,672 and 5,115,640. The fluid controller 11 comprises several sections, including a valve housing section 13, a wear plate 15, a section comprising a fluid meter 17, and an endcap 19. These sections are held together in tight sealing engagement by means of a plurality of bolts 21, which are in threaded engagement with the valve housing section 13.

The valve housing section 13 defines a fluid inlet port 23, a fluid return port 25, a pair of control (cylinder) fluid ports 27 and 29, and a load sensing fluid port 31.

The valve housing section 13 also defines a valve bore 33, and rotatably disposed therein is the controller valving which comprises a primary, rotatable valve member 35 (also referred to hereinafter as the "spool"), and a cooperating, relatively rotatable follow-up valve member 37 (also referred to hereinafter as the "sleeve"). At the forward end of the spool 35 is a set of internal splines 39 which provide for direct mechanical connection between the spool and the vehicle steering wheel W. The spool 35 and the sleeve 37 will be described in greater detail subsequently.

The fluid meter 17 may be of the type well known in the art, and in the subject embodiment, includes an internally-toothed ring member 41, and an externally-toothed star member 43. The star member 43 is eccentrically disposed within the ring member 41, for orbital and rotational movement relative thereto. The star member 43 is in splined connection with the rearward end of a main driveshaft 45, which defines, at its forward end, an enclosed, elongated slot 47. Extending transversely through the slot 47 is a drive pin 49 which permits driving connection between the shaft 45 and the sleeve 37. In the subject embodiment, it is preferable for the forward end of the driveshaft 45 to define the enclosed slot 47, rather than the conventional, open-ended arrangement, thus providing a greater total torque transmitting capability through the shaft 45 and the pin 49. In addition, by providing a stronger drive shaft 45, the diameter of the driveshaft can be reduced, and therefore, the radial thickness of the spool 35 can be increased, thus facilitating the location of check valves within the spool, in accordance with the teachings of U.S. Pat. No. 5,101,860, assigned to the assignee of the present invention, and incorporated herein by reference. The ends of the drive pin 49 pass through a pair of pin openings 51 defined by the spool 35 (see FIG. 6), and are received in relatively close-fit openings in the sleeve 37.

As is well known to those skilled in the art, pressurized fluid flows through the various passages and ports defined by the spool 35 and sleeve 37, then flows through the fluid meter 17, causing orbital and rotational movement of the star 43, within the ring 41. Such movement of the star 43 causes rotational follow-up movement of the sleeve 37, by means of the driveshaft 45, and drive pin 49, to maintain a particular relative rotational displacement (deflection) between the spool 35 and sleeve 37. The particular relative displacement (referred to hereinafter as a "rotary operating position"), is generally proportional to the rate of rotation of the steering wheel W, i.e., the rate of rotation of the spool 35.

Referring still to FIG. 2, disposed adjacent the forward end (left end in FIG. 2) of the spool 35 and sleeve 37, is a neutral (rotary) centering spring arrangement comprising a torsional spring 53, which surrounds a forward, reduced-diameter portion of the sleeve 37. As may be seen in FIG. 6, the spool 35 and sleeve 37 define overlapping windows 55 into which the opposite ends of the torsion spring 53 extend, and are seated therein. The circumferential extent of the windows 55 is a maximum when the spool and sleeve are in the rotary neutral position shown in FIGS. 2 and 6, but the windows decrease in the circumferential dimension, thus loading the spring 53, as the spool and sleeve are displaced from the rotary neutral position. Thus, the function of the torsion spring 53 is to bias the sleeve 37 toward the "rotary neutral position" (as that term will be defined in connection with FIG. 6) relative to the spool 35.

The valve bore 33 of the valve housing section 13 defines a plurality of annular fluid chambers surrounding the sleeve 37, to provide fluid communication between the various ports (23 through 31) and the outer surface of the sleeve 37. An annular chamber 23c receives pressurized fluid from the inlet port 23, while an annular chamber 25c communicates return fluid to the return port 25. Annular chambers 27c and 29c provide fluid communication to and from the control ports 27 and 29, respectively. Finally, annular chamber 31 c is in communication with the load signal fluid port 31.

The toothed interaction of the star 43, orbiting and rotating within the ring 41, defines a plurality of expanding and contracting fluid volume chambers 57, and adjacent each such chamber 57, the wear plate 15 defines a fluid port 59. The valve housing section 13 defines a plurality of axial bores 61 (only one of which is shown in FIG. 2), each of which is in open communication with one of the fluid ports 59. The valve housing section 13 further defines a pair of radial bores 63L and 63R, providing communication between each of the axial bores 61 and the valve bore 33, for purposes which are well known to those skilled in the art, and will be described in greater detail subsequently.

It is believed that the general operation of the fluid controller 11 is well known to those skilled in the art. As the steering wheel W is rotated, for example, in a clockwise direction, to achieve a right turn of the vehicle, the spool 35 is also rotated clockwise, as viewed by the vehicle operator (moves "downward" from the position shown in FIG. 6) opening a series of variable flow control orifices between the spool 35 and the sleeve 37. These orifices, which will be described in greater detail subsequently, permit fluid communication from the inlet port 23 through the valving, then through the radial bores 63L and some of the axial bores 61 to the expanding volume chambers 57 of the fluid meter 17. Fluid flowing from the contracting volume chambers of the meter 17 ("metered fluid") then flows through the other of the axial bores 61, through the radial bores 65R, and through the valving, then out through the cylinder port 27. Fluid returning from the steering cylinder C enters the cylinder port 29, then flows through the valve, and then out to the return port 25.

As was mentioned previously, the fluid controller 11 may be of the general type illustrated and described in above-incorporated U.S. Patent No. 5,115,640. The fluid controller 11 of the present invention is similar to the above-cited patent in that the controller valving provides both the main fluid path (MFP) just described, as well as a parallel, or auxiliary, fluid path (AFP). As is now known from several of the above-incorporated patents, the "parallel" fluid path permits fluid communication from the inlet port 23 into the valving, then out cylinder port 27, in parallel with the main fluid path, but with the "parallel" fluid path not flowing through the fluid meter 17.

The fluid controller 11 of the present invention differs from the controllers of the above-incorporated patents in several significant ways. First, as will be described in greater detail subsequently, in the controller 11, the parallel fluid path is designed to communicate a substantial fluid flow, and preferably, a flow greater than the main fluid path. Second, it is an important aspect of the present invention that the axial actuation of the sleeve 37 be accomplished by a direct mechanical actuation, rather than by a pilot fluid pressure acting on the ends of the sleeve, as in the incorporated patents.

ACTUATOR

Figures 3, 5:
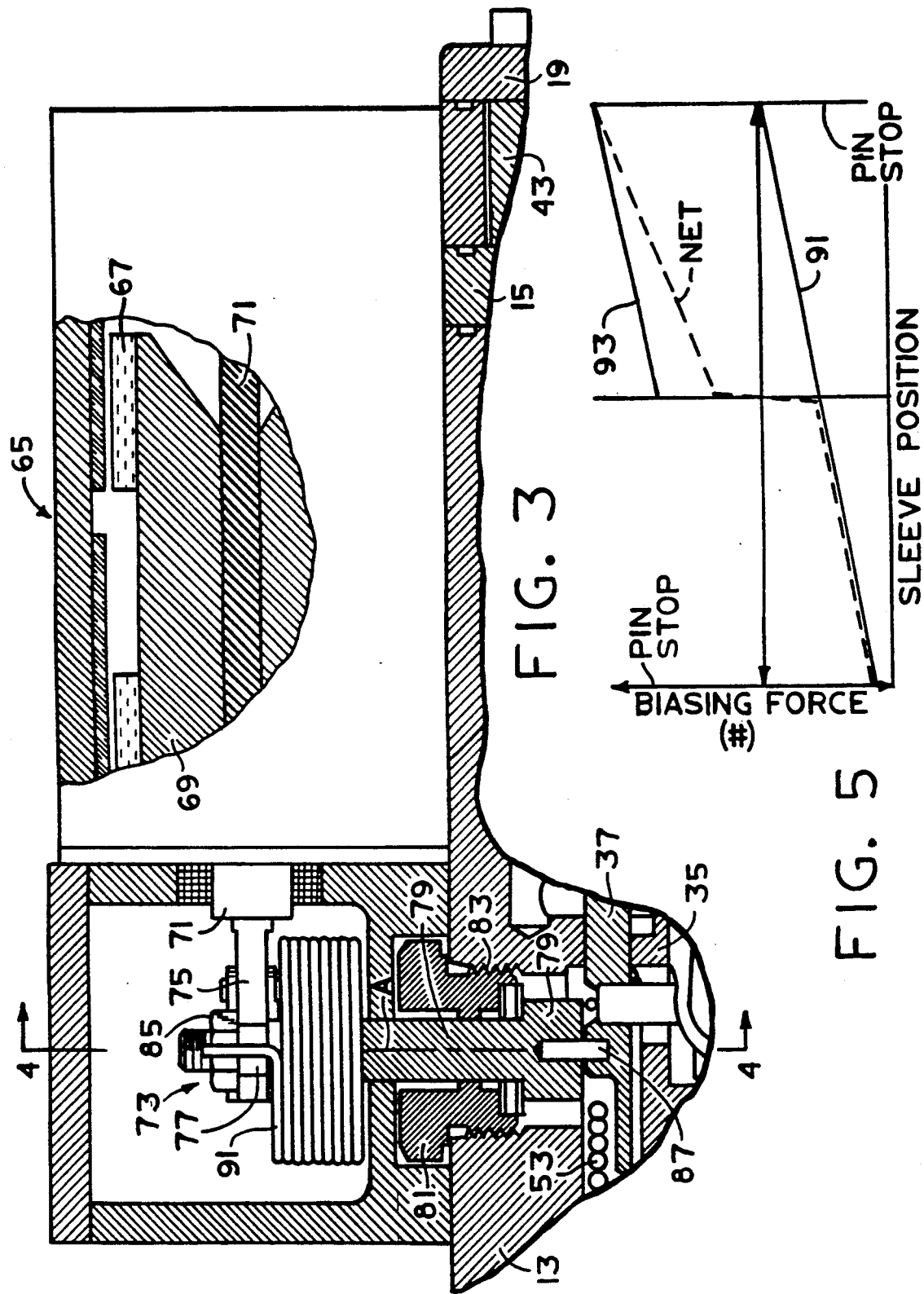
FIG. 3 is a view, partly in plan view, and partly in axial cross-section, of the actuator associated with the fluid controller shown in FIG. 2, and on the same scale as FIG. 2.
FIG. 5 is a graph of biasing force versus sleeve position, illustrating one aspect of the present invention.
Figure 4:
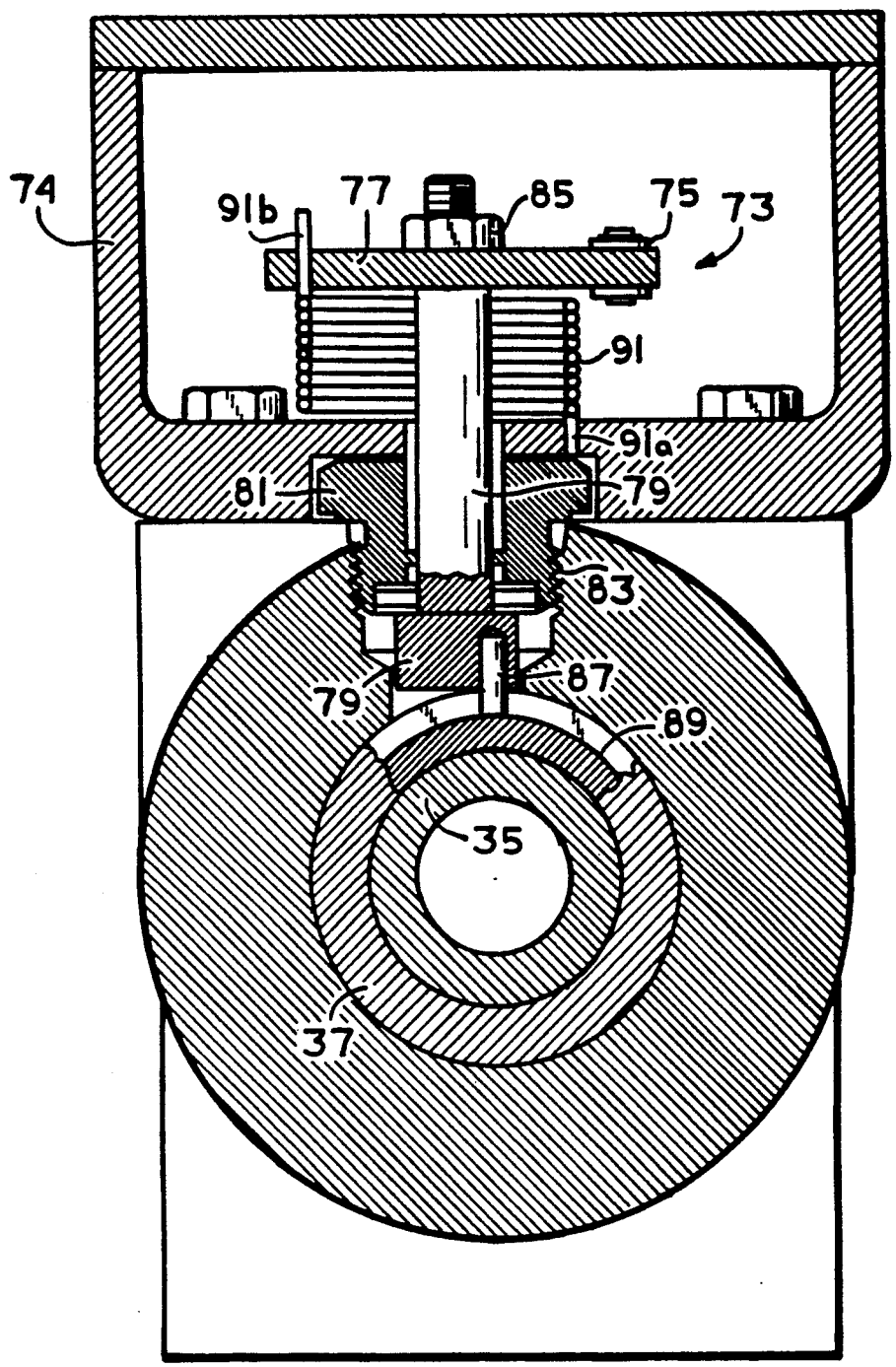
FIG. 4 is a transverse cross-section taken on line 4—4 of FIGS. 2 and 3, and on the same scale as FIG. 3.

Referring now to FIGS. 3 and 4, in conjunction with FIG. 2, there will be described one embodiment of an actuator mechanism to be used in the direct mechanical actuation of the sleeve 37, in accordance with the present invention. Those skilled in the art will understand that the actuator mechanism illustrated and described herein is by way of example only, and except as set forth in the appended claims, the present invention is not limited to any particular type or configuration of actuator mechanism.

Referring first to FIG. 3, the actuator mechanism of the present invention comprises a linear actuator, generally designated 65. In the subject embodiment, the linear actuator 65 includes an electromagnetic coil 67, which is energized by an electrical input signal (command signal CS) from the electronic controller EC. When the coil 67 is energized, it creates a magnetic field in a rare earth magnet 69, thus exerting an electromagnetic force on an armature member 71. The linear actuator 65 has a definite, physical neutral position, and when the coil 67 is energized, the magnetic field in the rare earth magnet 69 exerts a fairly constant force of approximately 5 lb. (2.25 kg.) on the armature 71, biasing the armature either forwardly or rearwardly in FIG. 3, depending upon the polarity of the command signal CS to the actuator 65. Furthermore, the actuator 65 is able to move the armature 71, from the neutral position, up to approximately one-half inch in either direction.

Referring now to FIG. 4, in conjunction with FIG. 3, the output end (left end in FIG. 3) of the armature member 71 is pivotally connected to a crank mechanism, generally designated 73, disposed within a crank housing 74, which includes a drag link 75. The drag link 75 includes an elongated, horizontally oriented portion 77, which is disposed about, and in engagement with, a rotatable actuator member 79. The actuator member 79 is rotatable about its axis of rotation A, and is rotatably supported within an actuator housing 81, the housing 81 defining external threads, and being in threaded engagement with an internally threaded opening 83 defined by the valve housing section 13. Toward its upper end, the actuator member 79 is externally threaded, and the horizontal portion 77 of the drag link 75 is retained on the actuator member 79 by means of a nut 85.

The actuator member 79 includes, at its lower end, a drive pin 87 which, preferably, is in a press fit in an opening defined by the member 79. As may best be seen in FIG. 4, the drive pin 87 is disposed eccentrically, relative to the axis of rotation A, for reasons to be explained subsequently. The drive pin 87 extends into an annular groove 89 defined by the sleeve 37, whereby rotation of the actuator member 79 in a clockwise direction (looking down on FIG. 4) will move the sleeve 37 forward (to the left in FIG. 2), and from the neutral axial position shown in FIG. 6 to the axial operating position shown in FIG. 7.

As may be seen in both FIGS. 3 and 4, surrounding the upper end of the actuator housing 81 is a torsional centering spring 91, having its upper vertical end 91$b$, engaging the horizontal portion 77 of the drag link 75, and its lower vertical end 91$a$ engaging the crank housing 74. Referring again briefly to FIG. 2, the wear plate 15 defines a plurality (only one of which is shown in FIG. 2) of cylindrical, axially oriented openings, within each of which is disposed a helical compression spring 93. Referring now also to the graph of FIG. 5, the axial biasing forces exerted on the sleeve 37 will be described. In the subsequent description, the specific biasing forces are by way of example only, and are in no way limiting. When the sleeve 37 is in its neutral axial position shown in FIG. 2, the torsional centering spring 91 exerts a biasing force of about 5 lb. (2.25 kg.), by means of the actuator member 79, tending to bias the sleeve rearwardly (to the right in FIG. 2). The wrap of the spring 91 is such that, as the sleeve 37 is moved forwardly (to the left in FIG. 2), the biasing force in the sleeve 37 gradually increases to about 10 lb. (4.5 kg.) when the sleeve engages the pin stop 49. If the sleeve 37 is moved rearwardly, past the axial neutral position, the torsional spring 91 gradually unwinds, until it exerts a substantially zero rearward biasing force on the sleeve 37 just as the sleeve reaches the pin stop in its rearwardmost position.

The helical compressions springs 93, as may be seen in FIG. 5, do not exert any axial force on the sleeve 37, whenever the sleeve is between its axial neutral position and its forward position. However, whenever the sleeve is displaced from its axial neutral position, rearwardly, there is instantly an axial force of about 10 lb. (4.5 kg.) tending to bias the sleeve to the left in FIG. 2, toward the neutral axial position. As the sleeve 37 moves further rearwardly, the biasing force increases until, just as the sleeve reaches its rearwardmost position and engages the pin stop 49, the axial force exerted by the springs 93 reaches about 15 lb. (6.75 kg.).

In the graph of FIG. 5, there is also shown a "NET" force exerted on the sleeve 37, tending to bias it toward the neutral axial position, the "NET" biasing force comprising the simple arithmetic sum of the biasing forces of the spring 91 and the springs 93. It should be apparent to those skilled in the art that, for any given axial position of the sleeve 37, the force generated by the actuator 65 must exceed the NET force being exerted by the springs 91 and 93. In the subject embodiment, the crank mechanism 73 multiplies the force output of the actuator 65 by a factor of about 4:1, so that the 5 lb. (2.25 kg.) force of the actuator results in an axial force on the sleeve of about 20 lb. (9.0 kg.).

Referring again primarily to FIG. 3, there is shown somewhat schematically, a sleeve position sensor, generally designated 95. In the subject embodiment, the sensor 95 senses the axial position of the armature member 71, and sends an appropriate signal back to the electronic controller EC. It will be understood by those skilled in the art that one of the important aspects of the fluid controller 11 of the present invention is the ability to operate in a "closed-loop" mode, i.e., the electronic controller EC commands a desired axial position of the sleeve 37 by sending the appropriate command signal CS to the linear actuator 65, which then directly, mechanically moves the sleeve 37 in the appropriate axial direction. At the same time, as the sleeve 37 is moving axially, a signal is being sent back to the electronic controller EC until the "loop" is closed and the error (difference between desired position and actual position) is reduced to zero.

It should be understood by those skilled in the art that the sleeve position sensor 95 could take many different forms, and could be located in several different locations, For example, within the scope of the present invention, the position sensor 95 could be disposed within the valve housing section 13, wherein it would directly, physically sense the position of the sleeve 37. Alternatively, the sleeve's position sensor could be operatively associated with some portion of the crank mechanism 73, and could comprise something such as a rotary potentiometer, such that it would sense the rotary position of the actuator member 79, and send a signal to the electronic controller EC, which would include software capable of converting the rotary position of the actuator member 79 into the axial position of the sleeve 37. Finally, and as shown somewhat schematically in FIG. 3, the sleeve position sensor 95 can be operatively associated with some portion of the actuator mechanism. In this embodiment also, it will be necessary to include in the electronic controller EC appropriate software, in view of the fact that the linear position of the armature member 71 is not directly indicative of the axial position of the sleeve 37, i.e., the relationship therebetween is not strictly linear. It is believed that the selection of an appropriate sleeve position sensor 95, as well as any appropriate software to be included in the electronic controller EC, is well within the ability of those skilled in the art. Although it is preferred to include such a sensor, thereby closing the loop, it is not an essential feature of the invention, and the particular sensor and software chosen is not essential.

VALVING

Referring now primarily to FIG. 6, the spool 35 and sleeve 37 will now be described in greater detail, with regard to the various passages and ports defined thereby. In connection with the subsequent description, it should be noted that certain of the ports and passages are arranged symmetrically, or generally symmetrically, with respect to an imaginary central reference plane RP, and such elements will be described by reference numerals followed by either an "L" or an "R", to indicate that the element is located on either the left side or the right side, respectively, of the reference plane RP. On the other hand, certain of the elements do not have a corresponding element oppositely disposed about the reference plane RP, and will be referred to by use of the reference numeral alone.

Figure 7:
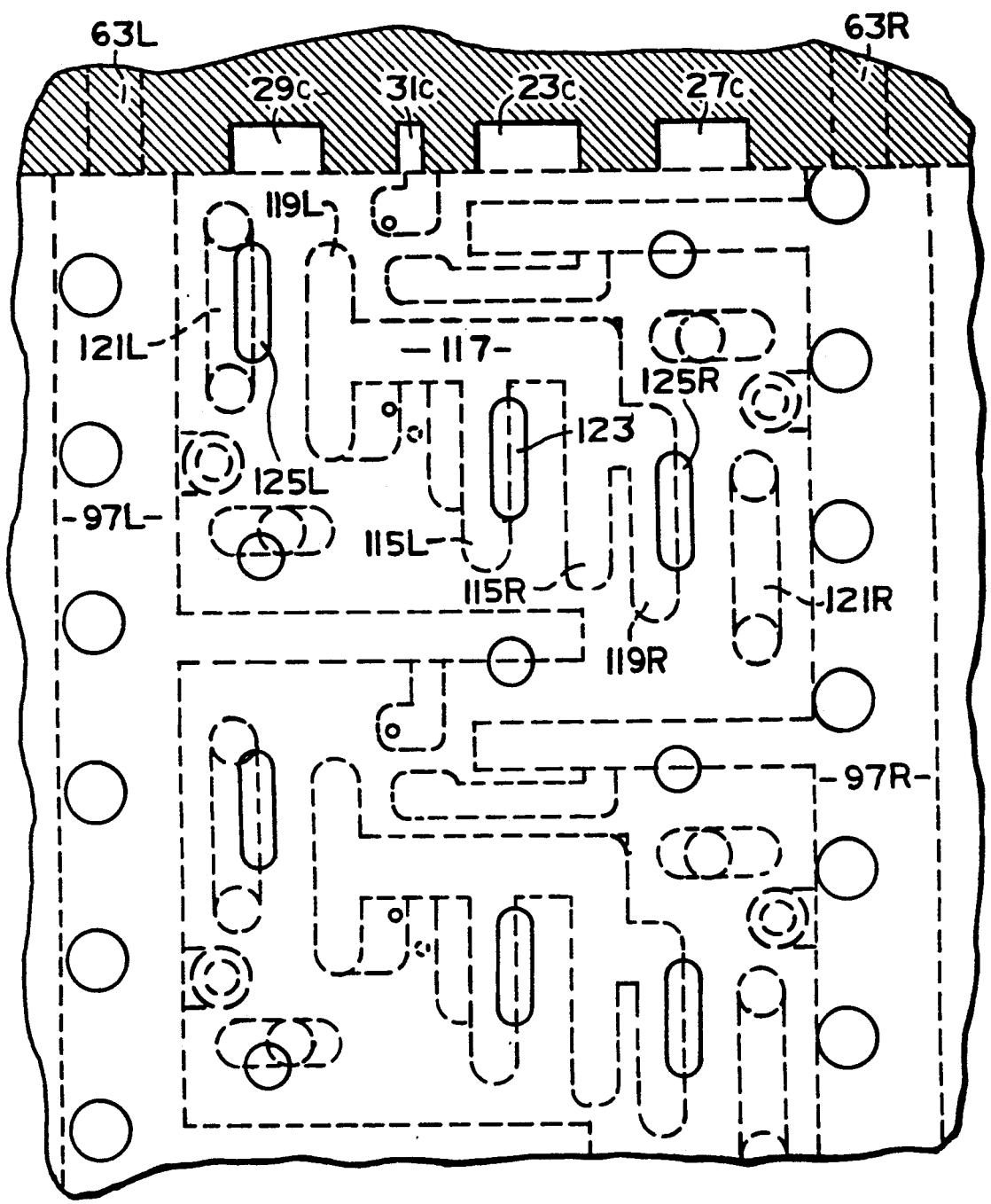
FIG. 7 is an enlarged, fragmentary, overlay view, similar to FIG. 6, but with the valving in a rotary operating and axial operating position.

It should be understood that the overlay views of FIGS. 6 and 7 are intended to illustrated primarily the interface between the outer cylindrical surface of the spool 35 (dashed lines) and the cylindrical inner surface of the sleeve 37 (solid lines). As a result, certain structural features which appear only on the outer surface of the sleeve will not be shown in FIGS. 6 and 7. It should be noted that in FIG. 6, the spool 35 and sleeve 37 are in a relative axial position corresponding to the neutral axial position shown in FIG. 2, and are in a relative rotational position corresponding to the rotary neutral position, also as shown in FIG. 2.

The spool 35 defines a pair of annular meter grooves 97L and 97R, which are axially aligned with the radial bores 63L and 63R, respectively. In communication with the meter groove 97L is a pressure passage 99L, and in communication with the meter groove 97R is a pressure passage 99R. Circumferentially adjacent each of the pressure passages 99L is a return passage 101 L, and circumferentially adjacent each of the pressure passages 99R, but in the opposite direction therefrom, is a return passage 101R. Toward the left end in FIG. 6, the spool 35 defines the pin openings 51, and the return passages 101L and 101R, and the pin openings 51 extend to the interior of the spool 35.

Referring still to FIG. 6, the sleeve 37 defines a pair of pressure ports 103, disposed on the reference plane RP. Disposed somewhat to the left of the pressure ports 103 is a plurality of load sensing ports 105, which are in open communication with the annular load sensing chamber 31c defined by the valve housing section 13. The sleeve 37 further defines an operating port 107L disposed adjacent the return passage 101L, and an operating port 107R, disposed adjacent the return passage 101R. Moving further axially away from the reference plane RP, the sleeve 37 defines a plurality of meter ports 109L in continuous fluid communication with the meter groove 97L, and a plurality of meter ports 109R, in continuous fluid communication with the meter groove 97R. Each of the meter ports 109L and 109R includes a generally rectangular opening defined by the outer surface of the sleeve (not shown herein), the purpose of the rectangular openings being to permit commutating fluid communication between the meter ports 109L and 109R, and the radial bores 63L and 63R, respectively, even when the sleeve 65 has been axially displaced in one direction or the other from the neutral axial position shown in FIG. 6. The rectangular openings described above are illustrated in greater detail in above-incorporated U.S. Pat. No. 5,115,640.

Finally, the sleeve 37 defines a plurality of tank ports 111, each of which is in continuous communication with the return port 25 (shown in FIG. 2) by means of the annular chamber 25c. All of the ports and passages described thus far relate to the rotary valving which, because it is generally well known to those skilled in the art, will be described only briefly hereinafter.

Referring now to FIG. 7, if the steering wheel W and the spool 35 are rotated clockwise (the spool moves "down" in FIG. 7), pressurized fluid flows from the inlet port 23 to the annular chamber 23c, then through the pressure ports 103, which are now overlapping the pressure passage 99L to define a main variable flow control orifice (A1r), the designation "r" after "A1" merely indicating an orifice formed in response to relative rotational movement of the spool and sleeve. A the same time, the pressure in the pressure passage 99L (downstream of the A1r orifice) is being "sensed" through one of the load sensing ports 105 which has now moved into fluid communication with the pressure passage 99L, by means of a generally L-shaped load sensing passage 113 defined by the spool 35, and in open communication with the adjacent pressure passage 99L.

Fluid flowing through the A1r orifice then flows into the meter groove 97L, then through the meter ports 109L to the fluid meter 17 (in the manner described previously), returning from the fluid meter 17 and flowing through the meter ports 109R and into the meter groove 97R. This "metered fluid" then enters the pressure passages 99R, which are now overlapping the operating ports 107R to define a variable flow control orifice (A4r). Metered fluid flows from the A4r orifice into the annular chamber 27c, and from there to the cylinder port 27c, then to the steering cylinder C. Fluid returning from the exhaust side of the steering cylinder C flows to the cylinder port 29, then into the annular chamber 29c, and then through an A5r orifice defined by the overlap of the operating ports 107L and the return passages 101L. This return fluid then flows through the interior of the spool 35, then radially out through the pin openings 51 and tank ports 111 to the annular chamber 25c, and then to the return port 25, and finally, to the system reservoir R. The abovedescribed flow path thus comprises the "main fluid path" defined when the spool and sleeve are displaced from the neutral rotary position to a rotary operating position. It should be noted that in FIG. 7, the spool and sleeve are also displaced axially, but for purposes of the above description of the "main fluid path" and the rotary operating position, concern is only with the relative rotary displacement between the spool and the sleeve. It should also be noted that the above-described main fluid path, as well as the flow control orifices A1r, A4r, and A5r, would be substantially identical regardless of the axial position of the sleeve 37 relative to the spool 35.

AXIAL VALVING

As was the case in the above-incorporated U.S. Pat. No. 5,115,640, it is an important aspect of the present invention that the valve members be laid out such that axial actuation thereof results in a parallel fluid path being defined within the fluid controller, with the parallel path preferably being separate and distinct from the main fluid path (just described) which is defined in response to relative rotation of the spool and sleeve. As used herein, "separate and distinct" in reference to the main and parallel fluid paths refers primarily to the fact that the main fluid path flows through the fluid meter 17, whereas the parallel fluid path does not. Obviously, the main and parallel fluid paths are not totally separate and distinct from the standpoint that both fluid paths commence in the annular chamber 23c, and the separate paths recombine in the annular chamber 27c (in the case of a right turn). In connection with the subsequent description of the axial valving, and in the appended claims, many elements such as ports, passages, etc., are referred to by means of the term "axial" It should be understood by those skilled in the art that such use of the term "axial" is not necessarily intended to denote a structural feature of the particular element, or a particular element, but instead, is intended to indicate that the particular element is related to the axial valving, and is involved in the definition of the parallel fluid path.

Referring first to FIG. 6, it will be noted that, disposed to the right and upward from each of the return passages 101L is an area of ports and passages (most of which extend circumferentially) which have not yet been described in detail, and which comprise the axial valving.

Referring now primarily to FIG. 7, the axial valving will be described in some detail, and it should be noted that, although the spool and sleeve in FIG. 7 have been rotatably displaced from the neutral rotary position the axial valving would operate in the same way in FIG. 7, regardless of the relative rotary position. Thus, it is one important aspect of the present invention that the rotary valving operates independently of the instantaneous axial position of the sleeve 37, while the axial valving operates independently of the instantaneous rotary position of the spool 35 and sleeve 37.

The spool 35 defines a pair of circumferentially-extending pressure passages 115L and 115R, which are interconnected by an axially-extending passage 117. The spool 35 further defines a pair of circumferentially-extending operating passages 119L and 119R, which are also interconnected through the axial passage 117. Disposed axially outward therefrom, the spool defines a pair of circumferentially-extending return passages 121L and a pair of circumferentially-extending return passages 121R.

The sleeve 37 defines a pair of circumferentially-extending pressure ports 123, a pair of circumferentially-extending operating ports 125L, and a pair of circumferentially-extending operating ports 125R. Referring again to FIG. 6, in conjunction with FIG. 7, it may be seen that with the sleeve in its neutral axial position, the pressure ports 123 are axially centered between the adjacent pressure passages 115L and 115R. Similarly, the operating ports 125L are axially centered between the operating passage 119L and the return passage 121L. Finally, the operating ports 125R are axially centered between the operating passages 119R and the return passages 121R.

With the sleeve 37 shifted from the neutral axial position shown in FIG. 6 toward the axial operating position shown in FIG. 7 (but assuming for purposes of explanation no relative rotary motion), the pressure ports 123 begin to overlap the pressure passages 115L, the cumulative overlap therebetween defining an A1a orifice, the designation "a" after the "A1" merely indicating an orifice formed in response to relative axial movement of the spool and sleeve. Pressurized fluid entering the pressure passages 115L then flows through the passages 117 and into the operating passage 119R. The passages 119R are now in fluid communication with the operating ports 125R, the cumulative overlap therebetween defining an A4a orifice. The fluid flowing through the A4a orifice, and out through the operating ports 125R, then flows into the annular chamber 27c, combining with the fluid in the main fluid path if there is rotary operation at the same time. As was described previously, the fluid returning from the steering cylinder C flows through the annular chamber 29c, and from there, the fluid flows through an A5a orifice defined by the cumulative overlap between the operating ports 125L and the return passages 121L. This return fluid then flows to the interior of the spool 35, and from there to the system reservoir in the manner described previously.

In above-incorporated U.S. Pat. No. 5,115,640, it was the general intent therein of the parallel flow path that it function primarily as an "error" correction flow path, i.e., most of the required flow to the steering cylinder would comprise the flow through the main fluid path, with the flow through the parallel (auxiliary) fluid path being controlled or adjusted such that the total flow would move the steering cylinder in a manner corresponding to the movement of the steering wheel. By way of contrast, it is one important aspect of the present invention that the parallel (auxiliary) flow path be capable of communicating a substantial flow of fluid, i.e., such that the flow through the parallel path defined by the axial valving is, in and of itself, sufficient to perform a steering operation, in the absence of any flow through the main fluid path. More specifically, in the subject embodiment of the invention, the flow through the main fluid path, in response to operation of the rotary valving, constitutes a relatively small flow, although it will be understood by those skilled in the art that the relatively small flow through the main fluid path must still be sufficient to achieve normal steering. Preferably, the fluid meter 17 and the various orifices in the rotary valving are sized such that the flow through the main fluid path is appropriate for performing a normal steering operation in the roading mode. However, in the subject embodiment, the various flow control orifices which comprise the axial valving are sized such that the flow through the parallel fluid path provides a relatively large flow, i.e., a flow which is large relative to that in the main fluid path. Preferably, the flow control orifices in the axial valving are sized such that the relatively large flow through the parallel fluid path is appropriate for operation in the working mode, as that term was described previously. By way of example only, the relatively large flow through the parallel fluid path may be in the range of 2-3 times the flow through the main fluid path.

In the event of a loss of hydraulic power to the fluid controller 11, for any one of a number of reasons well known to those skilled in the art, it will still be possible for the operator to steer the vehicle. Because the main fluid path provides the relatively small flow, the fluid meter 17 can be sized for a relatively small displacement, as was previously mentioned. As will be understood by those skilled in the art, the presence of a relatively small fluid meter makes it possible to manually steer, i.e., the operator rotates the steering wheel W to achieve actuation of the rotary valving, and the fluid meter 17 operates in the manner of a hand pump, pumping pressurized fluid to the steering cylinder C as is now well known in the art. While operating in the manual steering mode, the spool and sleeve are in the rotary operating position as shown in FIG. 7, but in the neutral axial position as shown in FIG. 6. The neutral axial position would typically be accomplished by the linear actuator 65 receiving a zero or "OFF" input signal, with the centering spring 91 and the compression spring 93 then returning the sleeve 37 to its neutral axial position as shown in FIG. 2.

ELECTRONIC WIDE ANGLE

U.S. Pat. No. 5,080,135, for a "LARGE DEFLECTION ANGLE ROTARY MODULATION STEERING VALVE" is assigned to the assignee of the present invention and incorporated herein by reference. In the device of the incorporated patent, the various ports and passages which define the orifices in the rotary valving are configured such that steering action occurs over a rotational displacement, between the spool and sleeve, of as much as fifty or sixty degrees. The "Wide Angle" controller of the above-incorporated patent has many advantages, such as the substantial elimination of jerk, without the need for any sort of cushion valve in the system. The "Wide Angle" controller of the above-incorporated patent is now enjoying substantial commercial success. However, the configuration of the ports and passages required to accomplish wide angle steering is such that the wide angle feature cannot be readily combined with axial valving of the type which would accommodate a separate, independent input, such as joystick steering. More specifically, it is not physically possible to combine the wide angle feature and axial valving feature in a controller of the normal size, i.e., having a spool and sleeve which are of a normal, reasonable size.

It is one important aspect of the present invention that the steering system and fluid controller of the subject embodiment make it possible to have either normal rotary steering (rotary valving), or separate, independent joystick steering (axial valving), both of which have already been described, or alternatively, to have what will be referred to hereinafter as "electronic wide angle" steering, which will be described in greater detail subsequently, in connection with the logic of FIG. 8. In general, it should be noted that the purpose of the electronic wide angle steering is to achieve substantially the same flow curve in a controller having only about twenty or twenty-two degrees of rotary displacement, as would be possible in the wide angle unit of above-incorporated U.S. Pat. No. 5,080,135. As used herein, the term "flow curve" refers to a curve or graph of Q (flow) versus $d\theta/dt$ (rate of rotary deflection of spool and sleeve).

Referring now to the control logic system shown in block diagram form in FIGS. 8A and 8B, another important aspect of the present invention will be described. It should be understood that the control logic illustrated in FIGS. 8A and 8B does not relate to the operating situation wherein the only input is by means of the steering wheel W. Instead, the control logic relates only to the situation wherein there is an additional input to the electronic controller EC, such as by means of the joystick J.

Figure 8A:
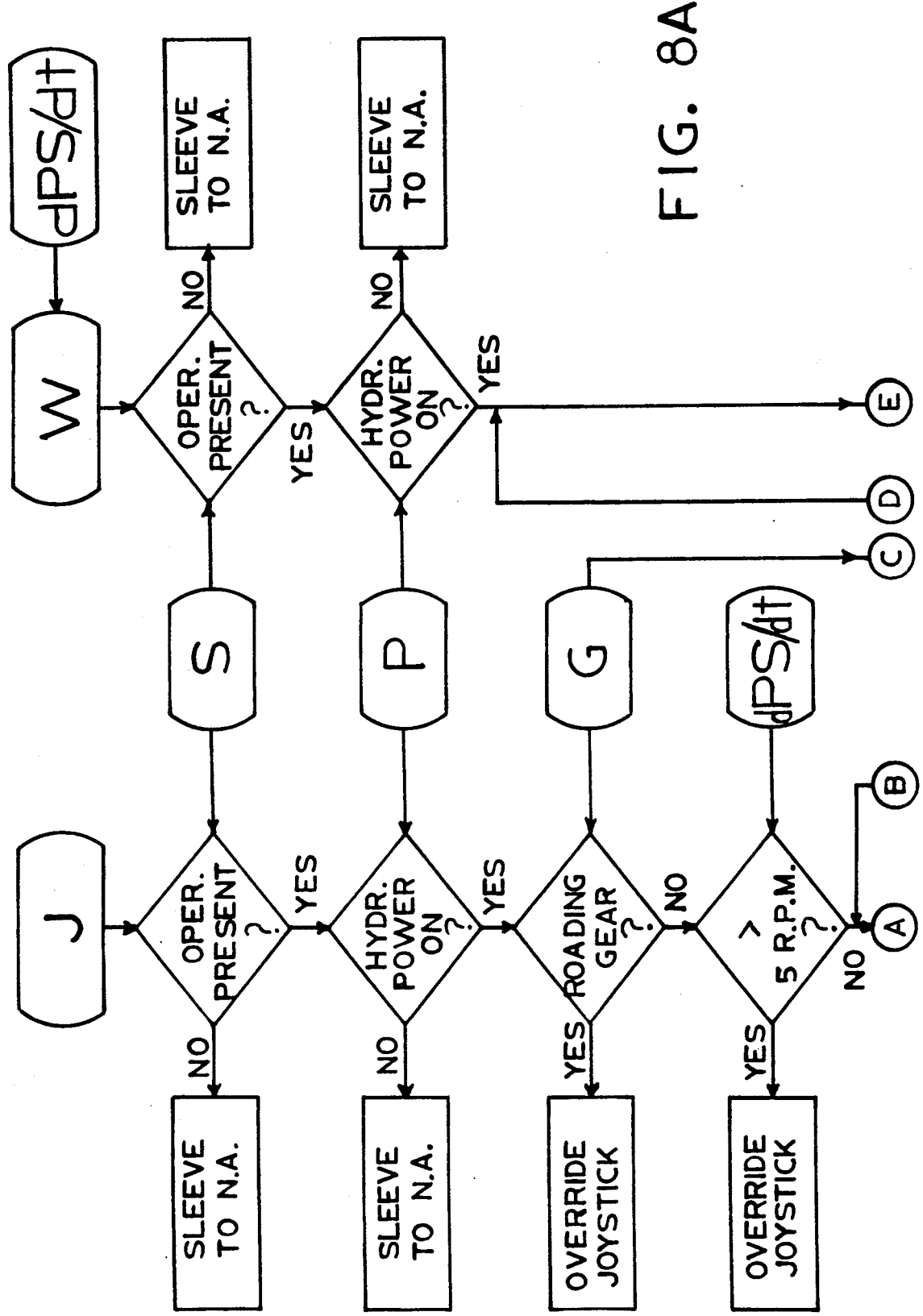

Referring first to FIG. 8A, it should be noted that there are six different inputs to the control logic, two of which are the inputs from the joystick J and the steering wheel W. In addition, there is an input signal from the operator's seat S indicating the presence or absence of the operator; an input from a pressure switch associated with the pump P, to indicate the presence or absence of hydraulic power (pressure) at the output of the pump P; an input signal from the transmission gear shift G, indicating which transmission gear is currently engaged; and a signal from the wheel position sensor PS indicating the velocity (dPS/dt) of the steering wheel W.

It should be noted that the wheel velocity signal from the wheel position sensor PS is shown in two different places. It should further be noted that, as is described in above-incorporated U.S. Pat. No. 5,115,640, it would be typical to differentiate the signal from the wheel position sensor PS to obtain the actual velocity signal (dPS/dt) which serves as the input shown in FIG. 8A.

Starting at the top of FIG. 8A, the control logic first considers the presence or absence of the vehicle operator. On either "side" of the logic (i.e., joystick or steering wheel input), if the input signal from the operator's seat S indicates that the operator is not present (NO), the electronic controller EC sends an appropriate signal to the linear actuator 65 whereby the sleeve 37 moves to the neutral axial ("N.A.") position.

If the vehicle operator is present ("YES"), the next step in the logic is to consider the signal from the pressure switch on the pump P. If the signal indicates that the hydraulic power is not on ("NO"), the sleeve 37 is permitted or commanded to its neutral axial position ("N.A.") in the same manner as described previously.

If there is hydraulic power ("YES"), the next step in the logic, in the case of joystick input, is to consider the input signal from the transmission gear shift G. If the input signal G indicates that the transmission is in one of the "roading" gears ("YES"), the appropriate operation is an interrupt or an "OVERRIDE". As used herein, the terms "interrupt" and "override" should be understood to mean and include either a complete cut-off of the signal from the electronic controller EC, which drives the sleeve 37 to an axially displaced position, or merely a reduction in the gain of the command signal CS from the electronic controller EC. If the input signal G indicates that the transmission is in a roading gear ("YES"), the appropriate operation would typically be a complete override, such that the joystick J would thereafter be unable to displace the spool and sleeve from the neutral axial position, and steering could be accomplished in response to only the rotation of the steering wheel W.

If the input signal G indicates that the transmission is not in a roading gear ("NO"), the logic proceeds to the next step in which the logic receives the input signal PS, representative of steering wheel position, or more likely, steering wheel speed. If the input signal PS indicates that the steering wheel W is being rotated at a rate exceeding a predetermined minimum (e.g., 5 rpm), and the result of the decision block is "YES", the resulting operation is again an "OVERRIDE", which again can be either a complete cut-off of the command signal or a reduction in the gain thereof. If the speed of rotation of the steering wheel W is below the predetermined minimum ("NO"), the logic proceeds to an operation "SHAPE" in which the input signal from the joystick J is "shaped" to give the appropriate, predetermined relationship of flow ("Q") in the parallel path versus the rate of movement of the joystick J, i.e., $d\theta/dt$.

Once the input signal from the joystick J has been appropriately shaped, the next step is to generate a corresponding command signal ("COMMAND SIGNAL CS") which is transmitted from the electronic controller EC to drive the sleeve 37 to the appropriate position. An additional input to the control logic is the feedback signal from the controller 11, and in the subject embodiment, from the linear actuator 65. If this feedback signal indicates that the sleeve 37 moved ("YES"), the operation of the control logic comes to an end. If not ("NO"), the control logic loops back to a point upstream of the "SHAPE" operation. In the portion of the logic relating to steering wheel input ("W"), the logic does not initially receive the input signal G from the transmission gear shift (i.e., the logic does not really care which gear in the transmission is engaged). After it has been determined that the hydraulic power is on ("YES"), the logic next proceeds to the "SHAPE" operation in which the logic considers the rate of rotation of the steering wheel W ("$d\theta/dt$"), and the input signal G from the transmission gear shift and "shapes" the input signal to the electronic controller EC to command the sleeve 37 to an appropriate axial position. By "appropriate" in regard to the sleeve position is meant a position such that the total flow (main fluid path plus parallel path) will be substantially equal to that which could have been accomplished in a wide-angle controller for the same $d\theta/dt$. Alternatively, the command signal CS from the electronic controller EC can be shaped in any manner desired, to provide any desired relationship of total flow ("Q") to steering wheel rotation rate "$d\theta/dt$".

In the same manner as described previously, the next step in the logic is to generate the actual command signal ("COMMAND SIGNAL CS") which is transmitted to the linear actuator 65. Subsequently, the logic considers the feedback signal from the sleeve 37, and if the sleeve has moved ("YES"), the control logic comes to an end. If the sleeve has not moved ("NO"), the logic loops back to a point upstream of the "SHAPE" operation.

In the fluid controller illustrated and described in above-incorporated U.S. Pat. No. 5,01 6,672, the axial movement of the sleeve was controlled by means of a pilot pressure, and there was no sleeve position feedback arrangement. As a result of the use of pilot pressure to position the sleeve, the overall system would typically respond more slowly than what is truly desirable. For example, in connection with the development of the structure of the above-incorporated patent, it was anticipated that the system response would have a bandwidth of approximately 5 Hertz. By way of contrast, because of the direct mechanical actuation of the sleeve 37 in the present invention, it is anticipated that the total system response time will have a bandwidth in the range of about 20 to 40 Hertz, i.e., the controller and logic together will be able to accomplish in the range of about 20 to 40 physical changes or corrections, per second, of the position of the sleeve.

Another aspect of improved system response time, with the present invention, relates to the point within the overall system at which the logic loop is "closed". It has been known previously to close the loop by sensing the steered wheel position ("WS"), but with the present invention, sensing sleeve position and providing feedback to the logic indicating that position, ("upstream" of steered wheel position) makes it possible for the system to respond more quickly to desired changes in steered wheel position.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

We claim:

1. A controller operable to control the flow of fluid from a source of pressurized fluid to a fluid pressure operated device; said controller being of the type including housing means defining an inlet port for connection to the source, a return port for connection to a reservoir, and first and second control fluid ports for connection to the fluid pressure operated device; valve means disposed in said housing means, and comprising a primary, rotatable valve member, and a cooperating, relatively rotatable follow-up valve member, said primary and follow-up valve members defining a neutral rotary position, and a rotary operating position in which said primary valve member is rotatably displaced from said neutral rotary position, relative to said follow-up valve member; said housing means and said valve members cooperating to define a main fluid path providing fluid communication between said inlet port and said first control fluid port and between said second control fluid port and said return port when said valve members are in said rotary operating position; said primary and follow-up valve members defining a neutral axial position and, an axial operating position in which said follow-up valve member is axially displaced from said neutral axial position, relative to said primary valve member; said housing means and said valve members cooperating to define an auxiliary fluid path providing fluid communication between said inlet port and one of said first and second control fluid ports and between the other of said control fluid ports and said return port when said valve members are in said axial operating position; characterized by:

(a) actuator means operably associated with said housing means and operable to generate a predetermined mechanical output in response to a predetermined electrical input signal; (b) means operable to convert said mechanical output of said actuator into axial motion of said follow-up valve member between said neutral axial position and said axial operating position.

2. A controller as claimed in claim 1, characterized by fluid actuated means for imparting rotary follow-up movement to said follow-up valve member, proportional to the volume of fluid flow through said main fluid path, when said valve members are in said rotary operating position.

3. A controller as claimed in claim 2, characterized by said main fluid path flowing through said fluid actuated means, and said auxiliary fluid path excluding said fluid actuated means.

4. A controller as claimed in claim 1, characterized by said primary valve member defining first and second fluid passages, and said follow-up valve member defining a first fluid port in continuous fluid communication with said inlet port, and a second fluid port in continuous fluid communication with said first control fluid port; said first and second fluid ports being blocked from fluid communication with said first and second fluid passages, respectively, when said valve members are in said neutral rotary position; and said first and second fluid ports being in fluid communication with said first and second fluid passages, respectively, to define first and second variable flow control orifices, respectively, when said valve members are in said rotary operating position, said main fluid path including said first and second variable flow control orifices.

5. A controller as claimed in claim 4, characterized by said primary valve member defining first and second axial fluid passages, and said follow-up valve member defining a first axial fluid port in continuous fluid communication with said inlet port, and a second axial fluid port in continuous fluid communication with said one of said first and second control fluid ports; said first and second axial fluid ports being blocked from fluid communication with said first and second axial fluid passages, respectively, when said valve members are in said neutral axial position and said first and second axial fluid ports being in fluid communication with said first and second axial fluid passages, respectively, to define first and second variable axial flow control orifices, when said valve members are in said axial operating position, said auxiliary fluid path including said first and second variable axial flow control orifices.

6. A controller as claimed in claim 5, characterized by said second axial fluid port being in continuous fluid communication with said first control fluid port when said valve members are in said axial operating position, whereby the fluid flow to the fluid pressure operated device comprises the sum of said main and auxiliary fluid paths, when said valve members are in both said rotary and said axial operating positions, simultaneously.

7. A controller as claimed in claim 5, characterized by said second axial fluid port being in continuous fluid communication with said second control fluid port when said valve members are in said axial operating position, whereby the fluid flow to the fluid pressure operated device comprises the difference between the flows in said main and auxiliary fluid paths, when said valve members are in both said rotary and said axial operating positions, simultaneously.

8. A controller as claimed in claim 7, characterized by said first and second axial fluid passages and said first and second axial fluid ports are configured such that movement of said valve members to said axial operation position is operable to define said first and second variable axial flow control orifices for any relative rotary position of said valve members.

9. A controller as claimed in claim 5, characterized by said rotary operating position comprises relative rotation of said valve members of at least about 20 degrees.

10. A controller as claimed in claim 1, characterized by said actuator means comprises an electromagnetic actuator having a centered position, corresponding to said neutral axial position of said follow-up valve member relative to said primary valve member.

11. A controller as claimed in claim 10, characterized by said electromagnetic actuator being operable to generate said predetermined mechanical output, in response to said predetermined electrical input signal, in either of two opposite directions from said centered position.

12. A controller as claimed in claim 10, characterized by means operable to bias said follow-up valve member toward said neutral axial position in the absence of said electrical input signal, said biasing means including at least one spring member.

13. A controller as claimed in claim 12, characterized by said means operable to convert said mechanical output into axial motion of said follow-up valve member comprises a crank member defining an axis of rotation and being rotatable about said axis of rotation during said conversion, from a centered position, corresponding to said centered position of said electromagnetic actuator and said neutral axial position of said follow-up valve member.

14. A controller as claimed in claim 13, characterized by said one spring member comprises a torsional spring member disposed in a surrounding relationship to said axis of rotation and having one end fixed relative to said housing means, and another end fixed to rotate with said crank member, whereby axial movement of said follow-up valve member from said neutral axial position, and rotation of said crank member from said centered position is in opposition to said torsional spring member.

15. A controller as claimed in claim 1, characterized by said primary and follow-up valve members, at any given rotary operating position, are both rotating relative to said housing means; and said means operable to convert said mechanical output of said actuator into axial motion of said follow-up valve member is operable to move said follow-up valve member axially between said neutral axial position and said axial operating position while said valve members are rotating relative to said housing means.

16. A controller as claimed in claim 1, characterized by said actuator means comprising an electromagnetic actuator including an output member having linear movement comprising said mechanical output, said linear movement of said output member being substantially proportional to changes in said electrical input signal.

17. A controller as claimed in claim 16, characterized by said means operable to convert said mechanical output into axial motion of said follow-up valve member comprises a crank assembly defining an axis of rotation, said crank assembly being operably associated with said output member to rotate about its axis of rotation in response to said linear movement of said output member.

18. A controller as claimed in claim 17, characterized by said follow-up valve member defining an annular groove on the outer surface thereof, and said crank assembly including a drive member offset from said axis of rotation of said crank assembly; said drive member being received within said annular groove and being disposed to move said follow-up valve member axially in response to rotation of said crank assembly about said axis of rotation.

19. A controller as claimed in claim 1, characterized by control means operable to receive control system inputs and generate, in response thereto, an appropriate predetermined electrical input signal for said electromagnetic actuator.

20. A controller as claimed in claim 19, characterized by sensor means operably associated with one of said electromagnetic actuator, said means to convert, and said follow-up valve member, and operable to sense a position thereof corresponding to the axial position of said follow-up valve member, said sensor means further being operable to generate a position feedback signal, representative of said axial position of said follow-up valve member; said position feedback signal comprising one of said control system inputs.

21. A controller as claimed in claim 20, characterized by said electromagnetic actuator including an output member having linear movement comprising said mechanical output; said sensor means being operably associated with said output member to sense said linear movement and generate said position feedback signal corresponding thereto.

22. A system for controlling the flow of fluid from a source of pressurized fluid to a fluid pressure operated device, said system including a controller operable to control the flow of fluid from the source to the device in response to movement of a first input means; said controller being of the type including housing means defining an inlet port, a return port, and first and second control fluid ports for connection to the device, first valve means disposed in said housing means, and said first valve means and said housing means cooperating to define a first fluid path providing fluid communication from said inlet port to said first control fluid port, and from said second control fluid port to said return port, in response to said movement of said first input means; second valve means disposed in said housing means, and said second valve means and said housing means cooperating to define a second fluid path providing fluid communication from said inlet port to said first control fluid port, and from said second control fluid port to said return port in response to movement of a second input means; characterized by:

(a) said second input means including an electromagnetic actuator operable to actuate said second valve means in response to receiving a predetermined electrical input signal;

(b) sensing means operable to sense the existence of a predetermined condition and generate an interrupt signal in response to said predetermined condition; and (c) interrupt means operable, in response to said interrupt signal, to interrupt said predetermined electrical input signal.

23. A system as claimed in claim 22, characterized by fluid actuated means for imparting follow-up movement to said first valve means, proportional to the volume of fluid flow through said first fluid path, when said first valve means is in an operating position.

24. A system as claimed in claim 23, characterized by said second fluid path, defined by said second valve means, excluding said fluid actuated means, when said second valve means is in an operating position.

25. A system as claimed in claim 24, characterized by the flow capacity of said first fluid path, when said first valve means is in said operating position, is relatively smaller, and the flow capacity of said second fluid path, when said second valve means is in said operating position, is relatively larger.

26. A system as claimed in claim 22, characterized by said predetermined condition comprises movement of said first input means at a rate in excess of a predetermined minimum rate.

27. A system as claimed in claim 22, characterized by said source of pressurized fluid includes pressure sensing means operable to sense fluid pressure flowing from the source, said predetermined condition comprises the sensing of a fluid pressure below a predetermined minimum pressure.

28. A system as claimed in claim 22, characterized by said system being adapted for use on a vehicle to be operated by a vehicle operator, said system further comprising sensing means operable to sense the presence and absence of the vehicle operator; said predetermined condition comprises the absence of the vehicle operator.

29. A system as claimed in claim 22, characterized by said system being adapted for use on a vehicle having a prime mover and a transmission, means operable to select a transmission gear ratio, and means operable to sense said selected transmission gear ratio, said predetermined condition comprises selection of a gear ratio above a predetermined maximum ratio.

30. A system as claimed in claim 22, characterized by said first valve means and said second valve means comprise common first and second valve members.

31. A system as claimed in claim 30, characterized by said first input means is operably associated with said first valve member, and said second input means is operably associated with said second valve member.

32. A system as claimed in claim 31, characterized by said first valve member comprises a primary, rotatable valve member, and said second valve member comprises a cooperating, relatively rotatable, follow-up valve member; said primary and follow-up valve members defining a neutral rotary position, and a neutral axial position.

33. A system as claimed in claim 32, characterized by said primary and follow-up valve members cooperating to define a rotary operating position, in which said valve members comprise said first valve means operable to define said first fluid path.

34. A system as claimed in claim 33, characterized by said primary and follow-up valve members cooperating to define an axial operating position, in which said valve members comprise said second valve means operable to define said second fluid path.

35. A controller operable to control the flow of fluid from a source of pressurized fluid to a fluid pressure operated device; said controller being of the type including housing means defining an inlet port for connection to the source, a return port for connection to a reservoir, and first and second control fluid ports for connection to the fluid pressure operated device; valve means disposed in said housing means, and comprising a primary, rotatable valve member, and a cooperating, relatively rotatable follow-up valve member, said primary and follow-up valve members defining a neutral rotary position, and a rotary operating position in which said primary valve member is rotatably displaced from said neutral rotary position, relative to said follow-up valve member; said housing means and said valve members cooperating to define a main fluid path providing fluid communication between said inlet port and said first control fluid port and between said second control fluid port and said return port when said valve members are in said rotary operating position; said primary and follow-up valve members defining a neutral axial position and, an axial operating position in which said follow-up valve member is axially displaced from said neutral axial position, relative to said primary valve member; said housing means and said valve members cooperating to define an auxiliary fluid path providing fluid communication between said inlet port and one of said first and second control fluid ports and between the other of said control fluid ports and said return port when said valve members are in said axial operating position; characterized by:
(a) said primary and follow-up valve members being configured such that:
  (i) for any given rotary operating position, said valve members define a known main fluid path, independent of the relative axial position of said valve members; and
  (ii) for any given axial operating position, said valve members define a known auxiliary fluid path, independent of the relative rotary position of said valve members.

36. A controller as claimed in claim 35, characterized by fluid actuated means for imparting rotary follow-up movement to said follow-up valve member, proportional to the volume of fluid flow through said main fluid path, when said valve members are in said rotary operating position.

37. A controller as claimed in claim 35, characterized by said main fluid path flowing through said fluid actuated means, and said auxiliary fluid path excluding said fluid actuated means.

38. A controller as claimed in claim 35, characterized by actuator means operably associated with said housing means and operable, in response to a predetermined input signal to provide axial motion of said follow-up valve member between said neutral axial position and said axial operating position.

39. A controller as claimed in claim 38, characterized by said primary and follow-up valve members, at any given rotary operating position, are both rotating relative to said housing means; and said actuator means is operable to move said follow-up valve member axially between said neutral axial position and said axial operating position while said valve members are rotating relative to said housing means.

40. A controller as claimed in claim 35, characterized by said rotary operating position of said valve members, and said main fluid path, is controlled in response to movement of a first input means, and said axial operating position of said valve members, and said auxiliary fluid path, are controlled in response to movement of a second input means.

41. A controller as claimed in claim 40, characterized by said second input means including an electromagnetic actuator operable to actuate said valve members in response to receiving a predetermined electrical input signal.

42. A controller as claimed in claim 41, characterized by means operable to sense said movement of said first input means, and generate an interrupt signal, operable to interrupt said predetermined electrical input signal to said second input means, in response to movement of said first input means, in excess of a predetermined minimum level of movement.

43. A controller as claimed in claim 40, characterized by said first input means operatively associated with said primary valve member, and said second input means is operatively associated with said follow-up valve member.

44. A controller as claimed in claim 35, characterized by the flow capacity of said main fluid path, when said valve members are in said rotary operating position, is relatively smaller, and the flow capacity of said auxiliary fluid path, when said valve members are in said axial operating position, is relatively larger.

* * * * *